No. 658,647.  
J. H. HUGHES.  
HAY RAKE.  
(Application filed Apr. 3, 1900.)  
Patented Sept. 25, 1900.
(No Model.)
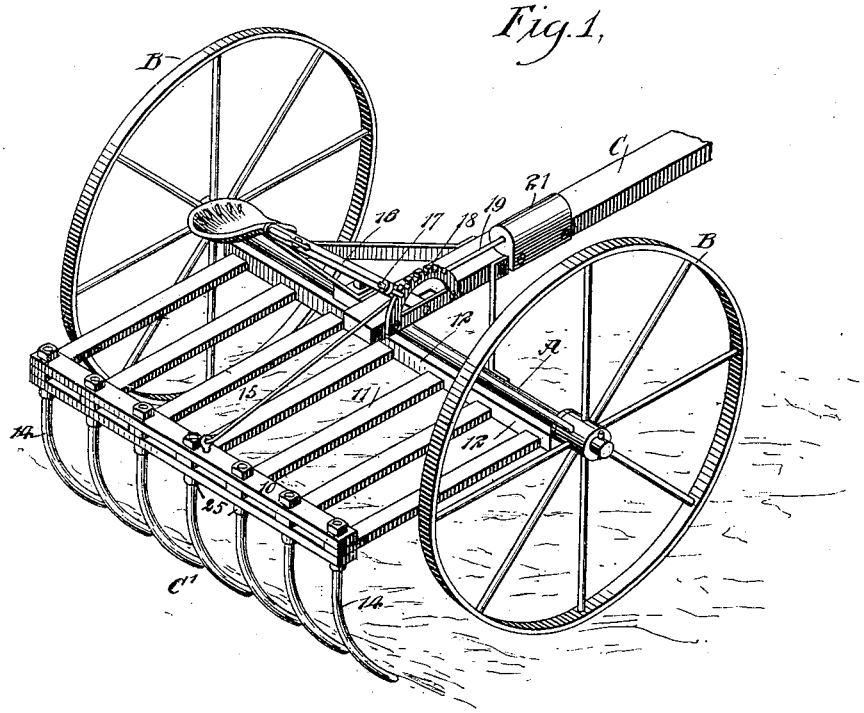
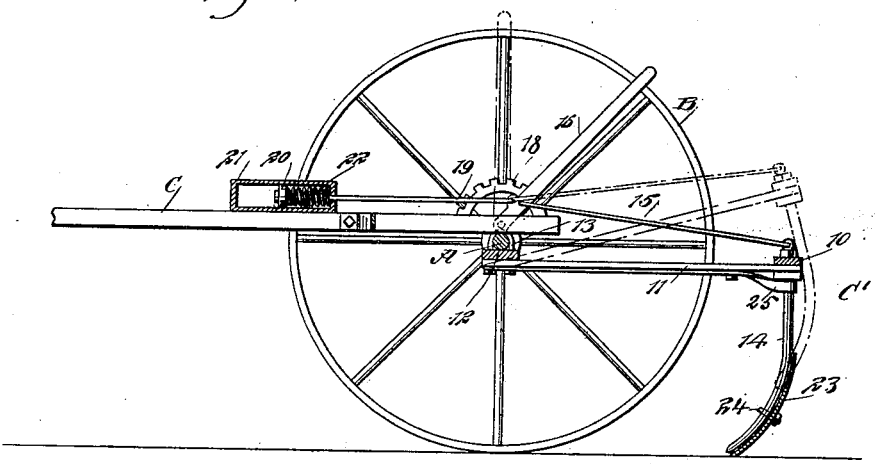
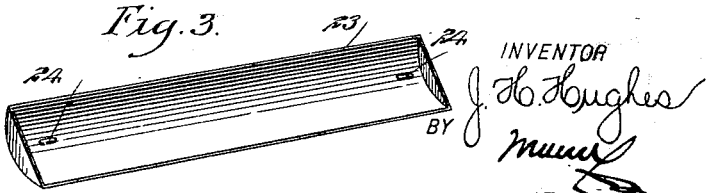
WITNESSES:
INVENTOR
ATTORNEYS

UNITED STATES PATENT OFFICE.

JAMES HENRY HUGHES, OF ALICEL, OREGON, ASSIGNOR OF ONE-THIRD TO EDWARD A. WILLS, OF SAME PLACE.

HAY-RAKE.

SPECIFICATION forming part of Letters Patent No. 658,647, dated September 25, 1900.

Application filed April 3, 1900. Serial No. 11,355. (No model.)

*To all whom it may concern:*

Be it known that I, JAMES HENRY HUGHES, a citizen of the United States, and a resident of Alicel, in the county of Union and State of Oregon, have invented a new and Improved Hay-Rake, of which the following is a full, clear, and exact description.

One purpose of the invention is to provide a horse hay-rake so constructed that teeth may be adjusted to or from the ground and held normally from the ground through the medium of a tension device, which tension device is connected, through the medium of a lever, with the head of the rake, and when the lever is not in engagement with a rack provided to hold it in certain positions said tension device will hold the rake-head in an upper position.

Another purpose of the invention is to provide a means whereby a plate may be readily attached to the teeth of the rake, so that stable-floors may be cleared or decayed straw distributed over a field, which could not be distributed through the medium of ordinary teeth.

Another purpose of the invention is to provide a wheel-supported rake-shaft especially adapted for distributing over a field the remnants of the straw from stacks in an even manner or so that said straw may be readily turned into the ground when the field is plowed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved machine. Fig. 2 is a longitudinal vertical section through the machine, and Fig. 3 is a detail perspective view of the scraper which is adapted for attachment to the teeth of the rake.

A represents an axle, B wheels which are mounted on said axle, and C the tongue or pole, which is ordinarily secured to the axle in any suitable or approved manner.

C' represents the rake, which consists of a head 10, of any suitable construction, provided with downwardly and forwardly curved teeth 14, and the head of the rake is attached to a forward cross-bar 12 by a series of longitudinal bars 11. The forward cross-bar 12 is located beneath the axle and is held to turn thereon by means of clips 13 or equivalent supports.

A link 15 is attached to the central portion of the rake, and this link is pivotally connected with a lever 16, fulcrumed upon the tongue or pole C. The lever 16 is provided with a thumb-latch 17, adapted to engage the teeth of a rack 18, which is likewise attached to the tongue or pole. A second link 19 is attached to the forward portion of the lever 16, and this latter link is provided with a head 20, adapted to slide in a cylinder 21, secured in any suitable or approved manner to the tongue or pole C. A spring 22 is coiled around the link 19 within the cylinder 21, the said spring having bearing against the rear end of the cylinder and against the head 20 of the link 19, as shown in Fig. 2. Thus it will be observed that when the lever 16 is out of engagement with the teeth of the rack 18 the spring 22 will tend to throw the rake upward and that the upward or downward movement of the rake may be controlled by moving the lever 16 either forward or rearward.

In Fig. 3 I have illustrated a scraper 23, which is of sufficient length and so curved that it may be fitted on the teeth 14 of the rake. This scraper, closed at its ends, is held in engagement with the teeth by means of clips 24 of any suitable construction. When the scraper is applied to the teeth, the machine may be effectually used on a barn or stable floor and will be effective likewise in a field when it is desired to distribute hay or litter which has been left to rot in bunches on the field, the rake at this time being so adjusted that it will just skim over the surface of the field.

In order to strengthen the teeth 14, braces 25 are carried from the forward beam 12 to the head of the rake, as shown in Fig. 2, which braces have eyes formed at their rear ends, and these eyes fit tightly around the upper portions of the teeth 14, as illustrated in Figs. 1 and 2.

Having thus described my invention, I claim as new and desire to secure by Letters Patent—

1. A wheel-supported axle, a rake-head pivotally mounted on the axle, a pole secured to the axle, a lever movable relatively to the pole, a latch for the lever, a link connection between the lever and the head of the rake, and a spring having a connection with the lever and operating to lift the rake-teeth when the lever is released, substantially as specified.

2. A wheel-supported axle, a rake-head pivotally mounted on the axle, a pole secured to the axle, provided with a lever and a latch for the lever, a link connection between the lever and the head of the rake, and a spring-controlled connecting-rod attached to the lever and mounted to slide in a casing carried by the pole, the said spring operating to lift the teeth when the lever is released as specified.

3. The combination, with a wheel-supported axle, a pole attached to the axle, and a rake-head pivotally mounted on said axle, of a lever fulcrumed upon the pole, a latch for the said lever, a casing located on the pole in advance of the lever, a link connecting the lever with the rake-head, and a rod attached to the lever and extending within the casing, which rod is provided within the casing with a head, and a spring located between the head and the end of the casing through which the rod enters, as specified.

In testimony whereof I have signed my name to this specification in the presence of two subscribing witnesses.

JAMES HENRY HUGHES.

Witnesses:
E. A. WILLS,
F. B. THARP.